US012606705B2

(12) United States Patent
Prenveille et al.

(10) Patent No.: US 12,606,705 B2
(45) Date of Patent: Apr. 21, 2026

(54) TRANSPARENT MOLDING COMPOSITIONS BASED ON POLYAMIDES, IMPACT MODIFIER AND SHORT GLASS FIBERS AND USES THEREOF

(71) Applicant: ARKEMA FRANCE, Colombes (FR)

(72) Inventors: Thomas Prenveille, Serquigny (FR); Mathieu Sabard, Serquigny (FR); Fabrice Glasson, Serquigny (FR); Olivier Massot, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 225 days.

(21) Appl. No.: 18/253,402

(22) PCT Filed: Nov. 16, 2021

(86) PCT No.: PCT/FR2021/052018

§ 371 (c)(1),
(2) Date: May 18, 2023

(87) PCT Pub. No.: WO2022/106776

PCT Pub. Date: May 27, 2022

(65) Prior Publication Data

US 2024/0026153 A1 Jan. 25, 2024

(30) Foreign Application Priority Data

Nov. 19, 2020 (FR) ...................................... 2011877

(51) Int. Cl.
| | |
|---|---|
| *C08L 77/06* | (2006.01) |
| *B32B 27/08* | (2006.01) |
| *B32B 27/34* | (2006.01) |
| *C08K 7/14* | (2006.01) |
| *C08L 53/02* | (2006.01) |
| *C08L 77/02* | (2006.01) |

(52) U.S. Cl.
CPC ................ *C08L 77/06* (2013.01); *C08K 7/14* (2013.01); *C08L 53/02* (2013.01); *C08L 77/02* (2013.01); *B32B 27/08* (2013.01); *B32B 27/34* (2013.01); *B32B 2262/101* (2013.01); *B32B 2270/00* (2013.01); *B32B 2307/412* (2013.01); *B32B 2307/546* (2013.01); *C08L 2201/10* (2013.01); *C08L 2203/30* (2013.01); *C08L 2205/025* (2013.01); *C08L 2205/03* (2013.01); *C08L 2207/53* (2013.01)

(58) Field of Classification Search
CPC .......... B32B 2262/101; B32B 2270/00; B32B 2307/412; B32B 2307/546; B32B 27/08; B32B 27/34; C08K 7/14; C08L 2201/10; C08L 2203/30; C08L 2205/025; C08L 2205/03; C08L 2207/53; C08L 53/02; C08L 77/02; C08L 77/06
See application file for complete search history.

(56) References Cited

U.S. PATENT DOCUMENTS

| | | | |
|---|---|---|---|
| 10,246,587 B2 | 4/2019 | Yasuda et al. | |
| 2002/0173596 A1* | 11/2002 | Montanari | C08L 77/06 |
| | | | 525/432 |
| 2009/0149600 A1 | 6/2009 | Ness | |
| 2011/0045269 A1* | 2/2011 | Wursche | B32B 27/281 |
| | | | 428/476.3 |
| 2015/0225505 A1* | 8/2015 | Blondel | A43B 1/14 |
| | | | 528/329.1 |
| 2016/0369098 A1* | 12/2016 | Yasuda | C08K 7/14 |
| 2018/0100064 A1 | 4/2018 | Aepli et al. | |
| 2019/0085164 A1 | 3/2019 | Sabard et al. | |

FOREIGN PATENT DOCUMENTS

| | | |
|---|---|---|
| EP | 0342066 A1 | 11/1989 |
| EP | 0722961 A1 | 7/1996 |
| EP | 3486287 A1 | 5/2019 |
| EP | 3309199 B1 | 4/2020 |
| EP | 3486287 | 7/2020 |
| FR | 3018280 A1 | 9/2015 |
| JP | 2014181341 A | 9/2014 |
| JP | 2017510677 A | 4/2017 |
| JP | 2002275371 A | 9/2022 |
| WO | 2017158301 A1 | 9/2017 |

OTHER PUBLICATIONS

International Search Report (PCT/ISA/210) and Written Opinion (PCT/ISA/237) mailed on Mar. 10, 2022 by the European Patent Office as the International Searching Authority for International Application No. PCT/FR2021/052018. (11 pages).
Office Action (with English translation) issued by the Japanese Patent Office (JPO) on Aug. 20, 2025, in related Japanese Application No. 2023528606, 6 pages.

* cited by examiner

Primary Examiner — John D Freeman
(74) Attorney, Agent, or Firm — Boone IP Law

(57) ABSTRACT

A transparent molding composition including, by weight (with a total of 100%): (A) 35 to 84% of a polyamide mixture including: 10 to 95% by weight of at least one semi-crystalline aliphatic polyamide, whose average number of carbon atoms relative to nitrogen atoms is greater than or equal to 8; 90 to 5% by weight of at least one amorphous polyamide; (B) from over 10 to 30% of at least one impact modifier; (C) from 6 to 20% of short glass fibers; (D) 0 to 10% of at least one prepolymer; and (E) 0 to 5% of at least one additive selected from stabilizers, dyes, plasticizers, processing aids or a mixture thereof, the index of refraction of each constituent (A), (B), (C) and (D) being included between 1.500 and 1.540, and wherein said composition has no PEBA and has a dry-measured modulus at 23° C. over 1700 MPa.

21 Claims, No Drawings

TRANSPARENT MOLDING COMPOSITIONS BASED ON POLYAMIDES, IMPACT MODIFIER AND SHORT GLASS FIBERS AND USES THEREOF

The present invention relates to transparent molding compositions based on a mixture of semi-crystalline aliphatic polyamide, whose average number of carbon atoms relative to the nitrogen atom is greater than or equal to 8, and of amorphous polyamide, impact modifier and short glass fibers, and optionally prepolymers, the index of refraction of the mixture of polyamides, impact modifier, short glass fibers and prepolymer being included between 1.500 and 1.540, said composition having no PEBA and having a high modulus, in particular greater than 1700 MPa, and the use of said composition for the production of articles obtained by injection, in particular for sport or for electronics.

The sports and electronics markets are currently requesting molding compositions based on transparent polyamides which, after molding, have a high modulus, in particular at least 1700 MPa, as well as good impact strength, a transmittance of at least 70% on a 2 mm wafer, and in particular for the sports market a good fatigue resistance, and for the electronics market good sebum resistance.

Patent EP3,309,199B1 describes compositions comprising a mixture of amorphous copolyamide and optionally of semi-crystalline polyamide, and glass fillers. The composition has a high transparency but has a low impact strength.

Patent FR3,018,280B1 describes compositions comprising a semi-crystalline polyamide, an amorphous polyamide, glass fibers and optionally a PEBA. These compositions exhibit a low transmittance and a slight haze.

However, no information on the modulus, impact properties or fatigue resistance is given.

Application EP3,486,287A1 describes compositions comprising a semi-crystalline polyamide, an impact modifier and a glass fiber S.

These compositions exhibit good fatigue strength but high haze and no information on the transmittance is given.

None of the compositions above satisfy the following three and/or four properties:

a transmittance greater than 70% or a haze of less than 50% a modulus greater than 1700 MPa a good impact strength and/or fatigue strength.

The present invention thus relates to a transparent molding composition, comprising by weight (with a total of 100%):

(A) 35 to 84% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from 10 to 30%, particularly 15 to 30% of at least one impact modifier;

(C) from 6 to 20% of short glass fibers; and (D) 0 to 10% of at least one prepolymer;

(E) 0 to 5%, in particular from 0.1 to 5%, of at least one additive selected from stabilizers, dyes, plasticizers, processing aids or a mixture thereof, the index of refraction of each constituent (A), (B), (C) and (D) being included between 1.500 and 1.540, wherein said composition has no polyether block amide (PEBA) and has a dry-measured modulus at 23° C. over 1700 MPa.

The inventors have therefore found, unexpectedly, that the addition of short glass fibers within a specific range, to an amorphous and semi-crystalline polyamide mixture in a specific range, and to impact modifiers in a specific range with optionally at least one prepolymer, the index of refraction of each constituent fiber of short glass, mixture of amorphous and semi-crystalline polyamide, impact modifier and prepolymer, made it possible to obtain compositions having a high modulus greater than 1700 MPa, a high transmittance and/or a slight haze as well as a good impact strength and/or a good fatigue strength.

An amorphous polyamide, in the sense of the invention, denotes a transparent amorphous polyamide having only a glass transition temperature (not a melting temperature (Tm)), or a polyamide that has very little crystallinity having a glass transition temperature and a melting point such that the crystallization enthalpy during the cooling step at a rate of 20 K/m in in differential scanning calorimetry, DSC, measured according to standard ISO 11357-3:2013 is less than 30 J/g, in particular less than 20 J/g, preferably less than 15 J/g. The glass transition temperature (Tg) measured by DSC at a heating rate of 20 K/m in according to standard ISO 11357-1:2009 and ISO 11357-2:2013 for these polyamides is greater than 75° C.

A semi-crystalline polyamide, in the meaning of the invention, denotes a polyamide that has a melting temperature (Tm) by DSC according to ISO standard 11357-3:2013, and a crystallization enthalpy during the cooling step at a rate of 20 K/m in by DSC measured according to ISO standard 11357-3 of 2013 greater than 30 J/g, preferably greater than 40 J/g.

The nomenclature used to define the polyamides is described in ISO standard 1874-1:2011 "Plastics-Polyamide (PA) Moulding And Extrusion Materials—Part 1: Designation" and is well known to a skilled person.

The term "polyamide" used in the present description covers both homopolyamides and copolyamides.

In one embodiment, the composition according to the invention is a thermoformable composition.

Regarding the Excluded PEBA:

Polyether block amides (PEBAs) are copolymers with amide units (Ba1) and polyether units (Ba2), said amide unit (Ba1) corresponding to an aliphatic repeating unit selected from a unit obtained from at least one amino acid or a unit obtained from at least one lactam, or a unit X·Y obtained by polycondensation:

of at least one diamine, said diamine being selected from a linear or branched aliphatic diamine, or an aromatic diamine or a mixture thereof, and of at least one dicarboxylic acid, said diacid being selected from an aliphatic diacid or an aromatic diacid, said polyether units (Ba2) being especially derived from at least one polyalkylene ether polyol, especially a polyalkylene ether diol.

For Constituent A:

Semi-Crystalline Polyamide

Constituent (A) comprises from 10 to 95% semi-crystalline aliphatic polyamide.

Advantageously, constituent (A) comprises from 15 to 90% by weight of semi-crystalline aliphatic polyamide.

More advantageously, constituent (A) comprises from 20 to 85% by weight of semi-crystalline aliphatic polyamide.

Even more advantageously, constituent (A) comprises from 25 to 80% by weight of semi-crystalline aliphatic polyamide.

In particular, constituent (A) comprises from 30 to 75% by weight of semi-crystalline aliphatic polyamide.

Said at least one semi-crystalline aliphatic polyamide is obtained from the polycondensation of at least one lactam, or from the polycondensation of at least one amino acid, or from the polycondensation of at least one diamine Xa with at least one dicarboxylic acid Ya.

The average number of carbon atoms relative to the nitrogen atom of the semi-crystalline aliphatic polyamide is greater than or equal to 8.

In particular, the average number of carbon atoms relative to the nitrogen atom of the semi-crystalline aliphatic polyamide is included between 8 and 14.

Advantageously, the average number of carbon atoms relative to the nitrogen atom of the semi-crystalline aliphatic polyamide is greater than or equal to 9.

In particular, the average number of carbon atoms relative to the nitrogen atom of the semi-crystalline aliphatic polyamide is included between 9 and 14.

More advantageously, the average number of carbon atoms relative to the nitrogen atom of the semi-crystalline aliphatic polyamide is greater than or equal to 10.

In particular, the average number of carbon atoms relative to the nitrogen atom of the semi-crystalline aliphatic polyamide is included between 10 and 14.

In the case of a PA-Xa·Ya homopolyamide, the number of carbon atoms per nitrogen atom is the average of unit Xa and unit Ya.

In the case of a copolyamide, the number of carbon atoms per nitrogen atom is calculated according to the same principle. The molar ratios of the various amide units are used for the calculation.

In one embodiment, the semi-crystalline aliphatic polyamide is a mixture of two semi-crystalline aliphatic polyamides, whose average number of carbon atoms relative to nitrogen atoms is included between 8 and 14, in particular included between 9 and 14, in particular included between 10 and 14.

When said at least one semi-crystalline aliphatic polyamide is obtained from the polycondensation of at least one lactam, it may therefore comprise a single lactam or several lactams.

Advantageously, said at least one semi-crystalline aliphatic polyamide is obtained from the polycondensation of a single lactam and said lactam is selected from caprolactam, laurolactam and undecanolactam, advantageously laurolactam.

It is quite obvious that if the lactam has an average number of carbon atoms relative to the nitrogen atom of the semi-crystalline aliphatic polyamide is less than or equal to 8, it will then be in the form of a copolyamide with another amino acid, lactam or PAXaYa so that the copolyamide has an average number of carbon atoms relative to the nitrogen atom greater than or equal to 8.

When said at least one semi-crystalline aliphatic polyamide is obtained from the polycondensation of at least one amino acid, said at least one amino acid may be selected from a C6 to C18, preferentially C10 to C18, more preferentially C10 to C12 amino acid.

A C6 to C12 amino acid is especially 6-aminohexanoic acid, 9-aminononanoic acid, 10-aminodecanoic acid, 10-aminoundecanoic acid, 12-aminododecanoic acid and 11-aminoundecanoic acid and derivatives thereof, especially N-heptyl-11-aminoundecanoic acid.

It is quite obvious that if the amino acid has an average number of carbon atoms relative to the nitrogen atom of the semi-crystalline aliphatic polyamide is less than or equal to 8, it will then be in the form of a copolyamide with another amino acid, lactam or PAXaYa so that the copolyamide has an average number of carbon atoms relative to the nitrogen atom greater than or equal to 8.

When said at least one semi-crystalline aliphatic polyamide is obtained from the polycondensation of at least one amino acid, it may comprise a single amino acid or several amino acids.

Advantageously, said semi-crystalline aliphatic polyamide is obtained from the polycondensation of a single amino acid and said amino acid is selected from 11-aminoundecanoic acid and 12-aminododecanoic acid, advantageously 11-aminoundecanoic acid.

When said at least one semi-crystalline aliphatic polyamide is obtained from the polycondensation of at least one diamine Xa with at least one diacid Ya, then the diamine is C4-C36, preferentially C5-C18, preferentially C5-C12, more preferentially C10-C12, with at least one C4-C36, preferentially C6-C18, preferentially C6-C12, more preferentially C10-C12 diacid Ya, and said at least one diamine Xa is an aliphatic diamine and said at least one diacid Ya is an aliphatic diacid.

The diamine may be linear or branched. Advantageously, it is linear.

Said at least one C4-C36 diamine Xa may be in particular selected from 1,4-butanediamine, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine, octadecenediamine, eicosanediamine, docosanediamine and the diamines obtained from fatty acids.

Advantageously, said at least one diamine Xa is C5-C18 and selected from 1,5-pentamethylenediamine, 1,6-hexamethylenediamine, 1,7-heptamethylenediamine, 1,8-octamethylenediamine, 1,9-nonamethylenediamine, 1,10-decamethylenediamine 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine.

Advantageously, said at least one C5 to C12 diamine Xa is in particular selected from 1,5-pentamethylenediamine, 1,6-hexamethylenediamine, 1,7-heptamethylediamine, 1,8-octamethyledimine, 1,9-nonamethylenediamine, 1,10-decamethylenediamine, 1,11-undecamethylenediamine, 1,12-dodecamethylenediamine.

Advantageously, said at least one C6 to C12 diamine Xa is in particular selected from 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine.

Advantageously, the diamine Xa used is a C10 to C12 diamine, in particular selected from 1,10-decamethylenediamine, 1,11-undecamethylenediamine, 1,12-dodecamethylenediamine.

Said at least one dicarboxylic acid Ya is C4 to C36 and may be selected from succinic acid, glutaric acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and diacids obtained from fatty acids.

The diacid may be linear or branched. Advantageously, it is linear.

Advantageously, said at least one dicarboxylic acid Ya is C6 to C18 and is selected from adipic acid, suberic acid, azelaic acid, sebacic acid, undecanedioic acid, dodecane-dioic acid, brassylic acid, tetradecanedioic acid, pentade-canedioic acid, hexadecanedioic acid, octadecanedioic acid.

Advantageously, said at least one dicarboxylic acid Ya is C6 to C12 and is selected from adipic acid, suberic acid, azelaic acid, sebacic acid, undecanedioic acid, and dode-canedioic acid.

Advantageously, said at least one dicarboxylic acid Ya is C10 to C12 and is selected from sebacic acid, undecanedioic acid and dodecanedioic acid.

It is clear that if diamine Xa has an average number of carbon atoms relative to the nitrogen atom of the semi-crystalline aliphatic polyamide is less than or equal to 8, it will then be associated with a dicarboxylic acid so that the copolyamide has an average number of carbon atoms rela-tive to the nitrogen atom greater than or equal to 8 and vice versa.

The polyamide XaYa may also have an average number of carbon atoms relative to the nitrogen atom of the semi-crystalline aliphatic polyamide is less than or equal to 8, but it will then be in the form of a copolyamide so that the copolyamide has an average number of carbon atoms rela-tive to the nitrogen atom greater than or equal to 8.

When said semi-crystalline aliphatic polyamide is obtained from the polycondensation of at least one diamine Xa with at least one dicarboxylic acid Ya, it may comprise a single diamine or several diamines and a single dicarbox-ylic acid or several dicarboxylic acids.

In an embodiment, said semi-crystalline aliphatic poly-amide is obtained from the polycondensation of a single diamine Xa with a single dicarboxylic acid Ya.

Advantageously, said semi-crystalline aliphatic poly-amide is selected from PA10, PA11, PA12, PA1010, PA1012, particularly PA11 and PA12.

Advantageously, the semi-crystalline polyamide is par-tially or totally biosourced.

Amorphous Polyamide

Constituent (A) also comprises 5 to 90% of at least one amorphous polyamide.

Advantageously, constituent (A) comprises from 10 to 85% amorphous polyamide.

More advantageously, constituent (A) comprises from 15 to 80% amorphous polyamide.

Even more advantageously, constituent (A) comprises from 20 to 75% amorphous polyamide.

In particular, constituent (A) comprises from 25 to 70% amorphous polyamide.

The amorphous polyamide is a polyamide with formula XY or A/XY, wherein:

A is a repeating aliphatic unit selected from a unit obtained from the polycondensation of at least one amino acid, a unit obtained from the polycondensation of at least one lactam, and a unit obtained from the polycondensation of at least one aliphatic diamine and at least one aliphatic diacid, X is at least one cycloaliphatic diamine, and Y is at least one dicarboxylic acid, said diacid being selected from a linear or branched aliphatic diacid, a cycloaliphatic diacid and an aromatic diacid, said diamine and said diacid comprising from 4 to 36 carbon atoms, advantageously from 6 to 18 carbon atoms.

Advantageously, the amorphous polyamide is a poly-amide of formula A/XY. The amino acid, lactam, diamine and dicarboxylic acid constituting unit A are as defined for the semi-crystalline aliphatic polyamide defined above.

The amorphous polyamide may be a homopolyamide or a copolyamide.

The molar proportions of diamine X and dicarboxylic acid Y are preferably stoichiometric.

The dicarboxylic acid comprises between 4 and 36 carbon atoms and, advantageously, between 6 and 18 carbon atoms.

The cycloaliphatic diamine may be chosen for example from bis(3,5-dialkyl-4-aminocyclohexyl)-m ethane, bis(3,5-dialkyl-4-aminocyclohexyl)ethane, bis(3,5-dialkyl-4-ami-nocyclohexyl)-propane, bis(3,5-dialkyl-4-aminocyclo-hexyl)-butane, bis-(3-methyl-4-aminocyclohexyl)-methane or 3'-dimethyl-4,4'-diamino-dicyclohexyl-methane com-monly called "BMACM" or "MACM" (and noted B below), p-bis(aminocyclohexyl)-methane commonly called "PACM" (and noted P below), isopropylidenedi(cyclohex-ylamine) commonly called "PACP," isophorone-diamine (noted IPD below) and 2,6-bis(amino methyl)norbornane commonly called "BAMN."

A non-exhaustive list of these cycloaliphatic diamines is given in the publication "Cycloaliphatic Amines" (Encyclo-pedia of Chemical Technology, Kirk-Othmer, 4th Edition (1992), pp. 386-405).

The dicarboxylic acid may be selected from linear or branched aliphatic dicarboxylic acids, cycloaliphatic dicar-boxylic acids and aromatic dicarboxylic acids.

When the dicarboxylic acid Y is aliphatic and linear, it is as defined above for diacid Ya.

When the dicarboxylic acid Y is cycloaliphatic, it may include the following carbon backbones: norbornylmethane, cyclohexane, cyclohexylmethane, dicyclohexylmethane, dicyclohexylpropane, di(methylcyclohexyl) or di(methylcy-clohexyl) propane.

When the dicarboxylic acid Y is aromatic, it may be selected from terephthalic acid (denoted T), isophthalic acid (denoted I) and a naphthalenic acid.

Advantageously, the dicarboxylic acid Y is aromatic; it may be selected from terephthalic acid (denoted T) and isophthalic acid (denoted I).

Advantageously, the amorphous polyamide is partially or totally biosourced.

Advantageously, the semi-crystalline aliphatic polyamide and/or the semi-crystalline polyamide is (are) partially or totally biosourced.

Advantageously, the amorphous polyamide is selected from 11/B10, 12/B10, 11/P10, 12/P10, 11/BI/BT, 12/BI/BT, 11/PI/BT, 12/PI/BT, 11/PI/PT, 12/PI/PT, 11/BI, 12/BI, 11/PI and 12/PI, in particular 11/B10.

Advantageously, the semi-crystalline aliphatic polyamide is selected from PA10, PA11, PA12, PA1010, PA1012, particularly PA11 and PA12 and the amorphous polyamide is selected from 11/B10, 12/B10, 11/P10, 12/P10, 11/BI/BT, 12/BI/BT, 11/PI/BT, 12/PI/BT, 11/PI/PT, 12/PI/PT, 11/BI, 12/BI, 11/PI and 12/PI, in particular 11/B10.

Advantageously, the semi-crystalline aliphatic polyamide is PA11 and the amorphous polyamide is selected from 11/B10, 12/B10, 11/P10, 12/P10, 11/BI/BT, 12/BI/BT, 11/PI/BT, 12/PI/BT, 11/PI/PT and 12/PI/PT, in particular 11/B10, 12/BI/BT.

Regarding the Impact Modifier (B):

The PEBAs are excluded from the definition of impact modifiers.

The impact modifier is present from 10% to 30% by weight, in particular from 15% to 30% by weight relative to the total weight of the composition.

The impact modifier may be any impact modifier as long as it is a polymer having a modulus below that of the resin, having good adhesion to the matrix, so as to dissipate cracking energy.

The impact modifier advantageously consists of a polymer having a flexural modulus below 100 MPa measured according to standard ISO 178 and a Tg below 0° C. (measured according to standard 11357-2 at the inflection point of the DSC thermogram), in particular a polyolefin.

The polyolefin of the impact modifier may be functionalized or non-functionalized or be a mixture of at least one functionalized polyolefin and/or at least one non-functionalized polyolefin. To simplify, the polyolefin is denoted (B) and functionalized polyolefins (B1) and non-functionalized polyolefins (B2) are described below.

It is clear that in the polyolefins described below, some, for example, without being limited thereto, the homopolymers of polyethylene or polypropylene, have an index of refraction of less than 1.500. In this case, said polyolefin cannot be used alone and must be mixed with one or more others so that the mixture has an index of refraction included between 1.500 and 1.540.

A non-functionalized polyolefin (B2) is classically a homopolymer or copolymer of alpha-olefins or diolefins, such as for example, ethylene, propylene, 1-butene, 1-octene, butadiene. By way of example, mention may be made of:

the homopolymers and copolymers of polyethylene, particularly LDPE, HDPE, LLDPE (linear low-density polyethylene), VLDPE (very low-density polyethylene) and metallocene polyethylene.

homopolymers or copolymers of propylene.

ethylene/alpha-olefin copolymers such as ethylene/propylene, EPR (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

copolymers of ethylene with at least one product selected from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) may be a polymer of alpha-olefins having reactive units (functionalities); such reactive units are acid, anhydride, or epoxy functions. By way of example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which may be completely or partially neutralized by metals such as Zn, etc.) or even by carboxylic acid anhydrides such as maleic anhydride.

The functionalized polyolefin (B1) may be chosen from the following, maleic anhydride or glycidyl methacrylate grafted, (co)polymers wherein the graft rate is for example from 0.01 to 5% by weight:

of PE, of PP, of copolymers of ethylene with propylene, butene, hexene, or octene containing for example from 35 to 80% by weight of ethylene;

ethylene/alpha-olefin copolymers such as ethylene/propylene, EPR (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

ethylene and vinyl acetate copolymers (EVA), containing up to 40% by weight of vinyl acetate;

ethylene and alkyl (meth)acrylate copolymers, containing up to 40% by weight of alkyl (meth)acrylate;

ethylene and vinyl acetate (EVA) and alkyl (meth)acrylate copolymers, containing up to 40% by weight of comonomers.

The functionalized polyolefin (B1) may also be selected from ethylene/propylene copolymers with predominantly maleic anhydride grafted propylene then condensed with a monoamine polyamide (or a polyamide oligomer) (products described in EP-A-0,342,066).

The functionalized polyolefin (B1) may also be a co- or terpolymer of at least the following units: (1) ethylene, (2) alkyl (meth)acrylate or vinyl ester of saturated carboxylic acid and (3) anhydride such as maleic anhydride or (meth)acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth)acrylic acid or maleic anhydride or glycidyl methacrylate copolymers.

In the preceding copolymers, (meth)acrylic acid may be salified with Zn or Li.

The term "alkyl (meth)acrylate" in (B1) or (B2) denotes C1 to C8 alkyl methacrylates and acrylates, and may be selected from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, the index MFI, the density of these polyolefins may also vary widely, which the person skilled in the art will know. MFI, abbreviation for Melt Flow Index, is a measure of fluidity in the molten state. It is measured according to standard ASTM 1238.

Advantageously, the functionalized polyolefin (B1) is selected from styrene/ethylene-butene/styrene (SEBS), styrene/butadiene/styrene (SBS), styrene/isoprene/styrene (SIS), styrene/ethylene-propylene/styrene (SEPS) block copolymers, grafted with maleic anhydride or glycidyl methacrylate, in which the degree of grafting is, for example, from 0.01 to 5% by weight.

It may for example be Kraton® FG 1901 (SEBS functionalized maleic anhydride), Globalprene® 9901 (SEBS functionalized maleic anhydride), Taipol® (SEBS maleic anhydride).

The MFI of the polyamide, the MFI of (B1) and (B2) may be selected in a wide range, however it is recommended that the MFI of the polyamide be greater than that of (B) in order to facilitate the dispersion of (B).

The impact modifier may also be a core-shell structure.

The core-shell preferably has the form of spherical polymer particles. These particles are also called core-shell particles or core-shell polymers. The first layer forms the core, the second or all the following layers form the respective shells.

The core-shell may be functionalized or non-functionalized. In the case where the core-shell is functionalized, this allows better compatibility with the polyamide matrix of said invention. As an example, a functionalization of the maleic anhydride type is preferred.

As for the spherical polymer particle size, it has an average particle size by weight of between 20 nm and 500 nm. Preferably, the weight average particle size of the polymer is between 20 nm and 400 nm, more preferably between 20 nm and 350 nm and advantageously between 20 nm and 300 nm.

The polymeric particle has a multilayer structure comprising at least one layer (F) comprising a polymer (F1) having a glass transition temperature of less than 0° C. and another layer (G) comprising a polymer (G1) having a glass transition temperature greater than 60° C.

Preferably, the polymer (G1) having a glass transition temperature greater than 60° C. is the outer layer of the polymeric particle with a multilayer structure.

The polymeric particle is obtained by a multi-step method, such as with two or three or more steps.

Preferably, the polymer (F1) having a glass transition temperature less than 0° C. in layer (F) is produced in the first step of the multi-step method forming the core of the polymer particle with a multilayer structure. Preferably, the polymer (F1) has a glass-transition temperature less than –5° C., more preferably less than –15° C., advantageously less than –25° C.

Preferably, the polymer (G1) having a glass-transition temperature greater than 60° C. is produced in the last step of the multi-step method forming the outer layer of the polymeric particle with a multilayer structure.

One or several additional intermediate layers obtained by one or several intermediate steps may be present.

The glass transition temperature Tg of the multilayer polymer may be estimated for example by dynamic methods such as thermomechanical analysis.

The polymer (F1) and the layer (F) comprise from 0% by weight to less than 50% by weight of monomers containing aromatic groups. The polymer (G1) and the layer (G) comprise from 0% by weight to less than 50% by weight of monomers containing aromatic groups.

According to one embodiment, the polymer (G1) and the layer (G) do not comprise monomers that contain aromatic groups.

As regards the polymer (F1) having a glass transition temperature less than 0° C., it comprises at least 50% by weight of polymeric units derived from isoprene or butadiene, and layer (F) is the innermost layer of the polymeric particle having a multilayer structure. In other words, layer (F) comprising the polymer (F1) is the core of the polymeric particle.

By way of example, the polymer (F1) of the core may consist of isoprene homopolymers or butadiene homopolymers, isoprene-butadiene copolymers, isoprene copolymers with up to 98% by weight of a vinyl monomer and butadiene copolymers with up to 98% by weight of a vinyl monomer. The vinyl monomer may be styrene, an alkyl styrene, acrylonitrile, an alkyl (meth)acrylate or butadiene or isoprene or the mixtures thereof, provided that the polymer (F1) comprises less than 50% by weight of monomers containing aromatic groups.

The polymer (F1) may be cross-linked. Crosslinking monomers useful in the present invention comprise, but are not limited to, aromatic polyfunctional vinyl compounds such as divinylbenzene and divinyltoluene, polyhydric alcohols such as ethylene glycol dimethacrylate and 1,3-butanediol diacrylate, trimethacrylates, triacrylates, allyl carboxylates such as allyl acrylate and allyl methacrylate, and di- and tri-allyl compounds such as diallyl phthalate, diallyl sebacate and triallyltriazine.

According to one embodiment, the core is a butadiene homopolymer.

According to another embodiment, the core is a butadiene-styrene copolymer.

More preferably, the glass transition temperature Tg of the polymer (F1) comprising at least 50% by weight of polymeric units derived from isoprene or butadiene is between –100° C. and 10° C., even more preferably between –80° C. and 0° C. and advantageously between –70° C. and –20° C.

As regards the polymer (G1), mention may be made of homopolymers and copolymers comprising monomers containing double bonds and/or vinyl monomers. Preferably the polymer (G1) is a (meth)acrylic polymer.

Preferably the polymer (G1) comprises at least 70% by weight of monomers selected from C1 to C12 alkyl (meth)acrylates. Even more preferably, the polymer (G1) comprises at least 80% by weight of C1-C4 alkyl methacrylate monomers and/or of C1-C8 alkyl acrylate monomers.

Most preferably, the acrylic or methacrylic monomers of the polymer (G1) are selected from methyl acrylate, ethyl acrylate, butyl acrylate, methyl methacrylate, ethyl methacrylate, butyl methacrylate and mixtures thereof, insofar as the polymer (G1) has a glass transition temperature of at least 60° C.

Polymer (G1) may comprise functional monomers selected from glycidyl (meth) acrylate, acrylic or methacrylic acid, amides derived from these acids, such as for example dimethylacrylamide, 2-methoxyethyl acrylate or methacrylate, and 2-aminoethyl acrylates or methacrylates and mixtures thereof.

Advantageously, the polymer (G1) comprises at least 70% by weight of monomer units derived from methyl methacrylate.

Preferably, the glass transition temperature Tg of the polymer (G1) is between 60° C. and 150° C. The glass transition temperature of the polymer (G1) is more preferably between 80° C. and 150° C., advantageously between 90° C. and 150° C., and more advantageously between 100° C. and 150° C.

Preferably, the polymer (G1) is grafted onto the polymer manufactured in the previous step.

According to certain embodiments, the polymer (G1) is crosslinked.

The core-shell may be obtained by a method with several steps comprising at least two steps. Such a method is described for example in documents US2009/0149600 or EP0,722,961.

Preferably the polymer (F1) having a glass transition temperature of less than 0° C. made during step (F) is the first step of the multistage process.

The ratio by weight ra of the polymer (F1) of the layer comprised in step (F) with respect to the complete multilayer polymer is at least 60% by weight, preferably at least 70% by weight, more preferably at least 75% by weight.

The weight ratio rb of the polymer (G1) of the outer layer in step (G) relative to the complete multilayer polymer is at least 5% by weight, preferably at least 6% by weight, more preferably at least 7% by weight.

According to the invention, the ratio rb between the outer layer (G) comprising the polymer (B1) and the complete multilayer polymer is at most 30% by weight.

Preferably, the ratio of polymer (G1) to the complete multilayer polymer is between 5% by weight and 30% by weight.

Advantageously, the impact modifier is selected from SEBS, SBS and a core-shell structure.

Regarding Short Glass Fibers (C):

Short glass fibers are present from 6 to 20% by weight in the composition, in particular from 6 to 15% by weight.

Short glass fibers may have a circular or non-circular section.

A fiber with a circular cross-section is defined as a fiber having at any point on its circumference a distance equal to the center of the fiber and thus represents a perfect or near-perfect circle.

Any glass fiber that does not have this perfect or near-perfect circle is therefore defined as a fiber with a non-circular section.

Non-limiting examples of non-circular section fibers are non-circular fibers having, for example, an elliptical, oval or cocoon shape, star shapes, flake shapes, flat fibers, cruciforms, a polygon and a ring.

The short glass fibers preferably have a length of between 2 and 13 mm, preferably 3 to 8 mm, before the compositions are used.

The glass fiber may be:

either with a circular cross-section having a diameter of between 4 μm and 25 μm, preferably between 4 and 15 μm.

or with a non-circular cross-section having a L/D ratio (where L represents the largest dimension of the cross-section of the fiber and D the smallest dimension of the cross-section of said fiber) between 2 and 8, in particular between 2 and 4. L and D may be measured by scanning electron microscopy (SEM).

Regarding the Prepolymer (D):

The at least one prepolymer is optionally present from 0 to 10% by weight relative to the total weight of the composition.

The term "prepolymer" refers to oligomers of polyamides necessarily of lower number average molecular weight than the polyamides used in the matrix, in particular said prepolymer has a number average molecular weight of 1000-15000 g/mol, in particular 1000-10000 g/mol.

The prepolymer may be selected from aliphatic, linear or branched, polyamide oligomers, cycloaliphatic polyamide oligomers, semi-aromatic polyamide oligomers, aromatic polyamide oligomers, aliphatic, linear or branched, cycloaliphatic, semi-aromatic and aromatic polyamides having the same definition as above.

The prepolymer or oligomer consequently comes from the condensation:

of at least one lactam, or of at least one amino acid, or of at least one diamine with at least one dicarboxylic acid, or a mixture thereof.

The prepolymer or oligomer cannot therefore correspond to the condensation of a diamine with a lactam or an amino acid.

The prepolymer may also be a copolyamide oligomer or a mixture of polyamide and copolyamide oligomers.

For example, the prepolymer is monofunctional NH2, monofunctional CO2H or difunctional CO2H or NH2.

The prepolymer may therefore be mono or difunctional, acid or amine, that is it has a single terminal amine or acid function, when it is monofunctional (in this case the other ending is non-functional, especially CH3), or two terminal amine functions or two terminal acid functions, when it is difunctional.

Advantageously, the prepolymer is monofunctional, preferably NH2 or CO2H.

It may also be non-functional with two endings, especially diCH3.

Monofunctional NH2 prepolymers may be produced by reacting an NH2 or COOH functionalized alkyl (linear or branched), preferably COOH, or aryl monocarboxylic acid after condensation of a lactam or amino acid or diamine with a dicarboxylic acid.

$DiNH_2$ prepolymers may be produced by reacting a diamine after the condensation of a lactam or amino acid or diamine with a dicarboxylic acid.

Monofunctional CO2H prepolymers may be produced by reacting an NH2 or COOH functionalized alkyl (linear or branched), preferably COOH, or aryl monocarboxylic acid after condensation of a lactam or amino acid or diamine with a dicarboxylic acid.

$DiCO_2H$ prepolymers may be produced by reacting a dicarboxylic acid after the condensation of a lactam or amino acid or diamine with a dicarboxylic acid.

Non-functional $diCH_3$ prepolymers may be produced by reacting the amine ends of the prepolymer with an alkyl monocarboxylic acid and the acid ends with an alkyl amine.

Advantageously, in the composition of the invention, the prepolymer is selected from long-chain polyamides and is compatible with the polyamide of the matrix, in particular the polyamide of the matrix is selected from long-chain polyamides, in particular aliphatic, semi-aromatic or cycloaliphatic.

Advantageously, said prepolymer corresponds to a polyamide, in particular an aliphatic polyamide, in particular selected from PA6, PA11, PA12, PA11/6 and PA6/12 or a mixture thereof.

Advantageously, a single prepolymer is used in the composition.

Said prepolymer used in a composition of the invention may have an average molecular weight by number included from 1000 to 15,000 g/mol, in particular from 1000 to 13,000 g/mol, in particular from 1000 to 10,000 g/mol, in particular from 1000 to 9000 g/mol, in particular from 1000 to 8000 g/mol, in particular from 1000 to 7000 g/mol, in particular from 1000 to 6000 g/mol, in particular from 1000 to 5000 g/mol, in particular from 2000 to 5000 g/mol, in particular from 2000 to 4000 g/mol, in particular from 2000 to 3000 g/mol.

Advantageously, the proportion by weight of prepolymer is included from 0.1 to 10%, in particular from 1 to 10% by weight, preferentially from 1 to 7% by weight, more preferentially from 3 to 7% by weight, even more preferentially from 5 to 7% by weight relative to the total weight of the composition.

Advantageously, the prepolymer is selected from a $diCH_3$, $diNH_2$, $monoNH_2$, mono acid, diacid and amino acid prepolymer.

In particular, the prepolymer is monoNH2 or monoacid or diacid, in particular monoNH2.

The index of refraction of each constituent (A), (B), (C) and (D) is included between 1.500 and 1.540 at 560 nm.

The index of refraction is measured at 23° C., at a wavelength of 560 nm on an Abbe refractometer from Atago (Model NAR_1T SOLID).

Regarding the index of refraction of the fibers, the latter is accessible in the data sheets and/or in the literature.

Regarding the Additives (E):

The at least one additive is optionally present from 0 to 5% by weight, in particular from 0.1 to 5%, relative to the total weight of the composition.

The at least one additive is selected from stabilizers, colorants, plasticizers, processing aids or a mixture thereof.

It should be noted that the composition after addition of the additives must retain its transparency properties.

As an example, the stabilizer may be a UV stabilizer, an organic stabilizer or more generally a combination of organic stabilizers, such as a phenol antioxidant (for example of the type Irganox 245 or 1098 or 1010 by Ciba-BASF), a phosphite antioxidant (for example Irgafos® 126 or Irgafos® 168 by Ciba-BASF) and even optionally other stabilizers like a HALS, which means hindered amine light stabilizer (for example Tinuvin 770 by Ciba-BASF), an anti-UV (for example Tinuvin 312 by Ciba), a phosphorus-based stabilizer. Amine antioxidants such as Crompton's Naugard 445 or even polyfunctional stabilizers such as Clariant's Nylostab S-EED may also be used.

This stabilizer may also be a mineral stabilizer, such as a copper-based stabilizer. By way of example of such mineral stabilizers, mention may be made of halides and copper acetates. Secondarily, other metals such as silver may optionally be considered, but these are known to be less effective. These copper-based compounds are typically associated with alkali metal halides, particularly potassium.

By way of example, the plasticizers are selected from benzene sulfonamide derivatives, such as n-butyl benzene sulfonamide (BBSA); ethyl toluene sulfonamide or N-cyclohexyl toluene sulfonamide; hydroxybenzoic acid esters, such as 2-ethylhexyl parahydroxybenzoate and 2-decylhexyl parahydroxybenzoate; esters or ethers of tetrahydrofurfuryl alcohol, like oligoethyleneoxytetrahydrofurfuryl alcohol; and esters of citric acid or of hydroxy-malonic acid, such as oligoethyleneoxy malonate.

Using a mixture of plasticizers would not be outside the scope of the invention.

Regarding the Composition:

The composition of the invention has a dry-measured modulus at 23° C. over 1700 MPa.

A distinction is made between different moduli (e.g. tensile modulus, flexural modulus, etc.). If we consider the flexural modulus, it is always lower than the tensile modulus.

These moduli may be impacted by temperature and by the moisture level in the sample.

In one embodiment, the above defined modulus corresponds to both the flexural modulus and the tensile modulus, the flexural modulus being measured according to standard ISO 178:2010 and the tensile modulus (or modulus of elasticity E) being measured according to standard ISO 527-1 and 2:2012.

In another embodiment, the above defined modulus corresponds to the flexural modulus and is measured as above.

In another embodiment, the above defined modulus corresponds to the tensile modulus and is measured as above.

In one embodiment, the composition of the invention having a flexural and tensile modulus, dry-measured at 23° C., greater than 1700 MPa.

Advantageously, the flexural or tensile modulus dry-measured at 23° C. is greater than 1800 MPa.

Advantageously, the tensile modulus dry-measured at 23° C. over 1900 MPa, in particular 2000 MPa.

In one embodiment, the transparent molding composition of the invention exhibits a transmittance of over 70%, as measured according to ASTM D1003 on plates of 2 mm thick having a width and a length of 100 mm*100 mm made in a non-polished mold from said polyamide molding composition.

Advantageously, the transmittance is over 75%, in particular greater than or equal to 80%.

In another embodiment, the transparent molding composition has a haze of less than 50%, in particular less than 40%, as measured according to ASTM D1003 on plates 2 mm thick having a width and a length of 100 mm*100 mm made in a non-polished mold from said polyamide molding composition.

Advantageously, the haze is less than or equal to 35%.

Advantageously, the transparent molding composition of the invention has a transmittance greater than 70%, and a haze of less than 50%, in particular less than 40%, as measured according to ASTM D1003 on plates of 2 mm thickness having a width and a length of 100 mm*100 mm made in a non-polished mold from said polyamide molding composition.

Advantageously, the transmittance is greater than 75%, in particular greater than or equal to 80% and the haze is less than or equal to 35%.

In yet another embodiment, the transparent molding composition of the invention has an impact resilience greater than 15 $KJ/m^2$, in particular greater than 17 $KJ/m^2$, as determined according to ISO 179-1: 2010/1 eA (Charpy impact) on bars of size 80 mm×10 mm×4 mm, V-notched, at a temperature of 23° C.±2° C. at a relative humidity of 50%±10% on dry samples.

The composition of the invention is a transparent molding composition comprising, by weight (with a total of 100%):

(A) 35 to 84% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from 10 to 30%, particularly 15 to 30%, of at least one impact modifier;

(C) from 6 to 20% of short glass fibers; and (D) 0 to 10% of at least one prepolymer;

(E) 0 to 5%, in particular from 0.1 to 5%, of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

Advantageously, the transparent molding composition is made up of, by weight (with a total of 100%):

(A) 35 to 84% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 0 to 10% of at least one prepolymer;

(E) 0 to 5%, in particular from 0.1 to 5%, of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

In another embodiment, the transparent molding composition comprises, by weight (with a total of 100%):

(A) 35 to 83% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 1 to 10% of at least one prepolymer;

(E) 0 to 5%, in particular from 0.1 to 5%, of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

In another embodiment, the transparent molding composition is made up of, by weight (with a total of 100%):

(A) 35 to 83% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 1 to 10% of at least one prepolymer;

(E) 0 to 5%, in particular from 0.1 to 5%, of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

In yet another embodiment, the transparent molding composition comprises, by weight (with a total of 100%):

(A) 35 to 83.9% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 0 to 10% of at least one prepolymer;

(E) 0.1 to 5% of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

Advantageously, it made up of, with a total of 100%:

(A) 35 to 83.9% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 0 to 10% of at least one prepolymer;

(E) 0.1 to 5% of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

In yet another embodiment, said composition comprises In yet another embodiment, the transparent molding composition comprises, by weight (with a total of 100%):

(A) 35 to 82.9% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 1 to 10% of at least one prepolymer;

(E) 0.1 to 5% of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

Advantageously, it made up of, with a total of 100%:

(A) 35 to 82.9% of a polyamide mixture comprising:

10 to 95% by weight of at least one semi-crystalline aliphatic polyamide, whose average number of carbon atoms relative to nitrogen atoms is greater than or equal to 8;

90 to 5% by weight of at least one amorphous polyamide;

(B) from over 10 to 30%, particularly 15 to 30% of at least one impact modifier;

(C) from 6 to 20% of short glass fibers; and (D) 1 to 10% of at least one prepolymer;

(E) 0.1 to 5% of at least one additive selected from stabilizers, dyes, plasticizers, processing aids or a mixture thereof, the index of refraction of each constituent (A), (B), (C) and (D) being included between 1.500 and 1.540, wherein said composition has no PEBA and has a dry-measured modulus at 23° C. over 1700 MPa.

In a first variant, the semi-crystalline aliphatic polyamide is predominant in the mixture (A), in particular it is included between 51% to 80% by weight in said mixture.

The term "predominant" therefore means that in the mixture (A) the semi-crystalline aliphatic polyamide is present at more than 50% in the mixture and the amorphous polyamide is present at less than 50%.

The amorphous polyamide is therefore present in particular in the mixture at 20 to 49%.

All embodiments of the compositions detailed above are valid for this first variant.

Advantageously, in this first variant, the composition has a resistance to the non-notched Ross Flex fatigue test greater than 50,000 cycles at 23° C., as determined according to standard ASTM D1052 with a non-notched and non-drilled sample and a folding angle of 60°.

According to another aspect, the present invention relates to the use of a composition as defined above for the first variant for the production of articles obtained by injection, selected from a sports article, in particular a sport boot in particular a ski boot or a ski boot part or a rigid shoe with cleats such as a soccer, rugby or football cleat, hockey skates or a part of hockey skates, or a running shoe, a golf ball or a part of a golf ball, or a lacrosse stick, hockey article such as a helmet and sport articles for protecting the head, shoulders, elbows, hands, knees, back or shins, such as helmets, gloves, shoulder pads, elbow pads, knee pads or shin guards.

Advantageously, said composition of the first variant is used to manufacture an outer sole of a sports shoe allowing, due to its transparency, to see the pattern and the color of the intermediate sole of said sports shoe through the outer sole.

In a second variant, the amorphous polyamide is predominant in the mixture (A), in particular it is included between 55% to 85% by weight in said mixture.

The term "predominant" therefore means that in the mixture (A) the amorphous polyamide is present at more than 50% in the mixture and the semi-crystalline aliphatic polyamide is present at less than 50%.

The semi-crystalline aliphatic polyamide is therefore present in particular in the mixture from 15 to 45%.

All the embodiments of the compositions described above are also valid for this second variant.

According to another aspect, the present invention relates to the use of a composition as defined for the second variant, for the manufacture of an article for electronics, for telecom applications or for data exchange, such as for an autonomous vehicle or for applications connected to each other.

According to yet another aspect, the present invention relates to a method for preparing a composition as defined above, comprising a step of mixing constituents (A), (B), (C), (D) and (E) in an extruder, at a temperature included between 230 and 330° C., to produce granules, granules that will be then injected at a temperature included between 230 and 330° C., on an injection press to produce the desired articles.

This preparation method therefore relates to all the compositions defined above, whether they are compositions in general or compositions of the first and second variants.

A transparent shaped article, such as a fiber, cloth, film, sheet, rod, tube, injected part, comprising the composition as defined above, which may be made in the form of a dry mixture or after compounding on an extruder.

The article therefore relates to all the compositions defined above, whether they are compositions in general or compositions of the first and second variants.

According to another aspect, the present invention relates to a molded composite article which comprises a resin element (I) comprising a composition as defined above and a resin element (II) comprising a composition comprising a semi-crystalline thermoplastic polymer, advantageously a thermo-polyurethane (TPU) or a foamed or non-foamed polyether block amide (PEBA), wherein the resin element (I) is directly joined or bonded to the resin element (II).

A method for producing a molded composite article as defined above, which comprises heating at least one resin (I) and a resin (II), to attach one resin to the other resin.

EXAMPLES

Preparation of the Compositions of the Invention and Mechanical Properties:

The compositions of tables I and II were prepared by mixing molten polyamide granules with the impact modifiers and short glass fibers and optionally prepolymers and additives. This mixture was made by compounding on an 18 mm diameter twin-screw co-rotating extruder with a flat temperature profile)(T° at 250° C. The screw speed is 300 rpm and the flow rate is 8 kg/h.

The introduction of the short glass fibers is carried out with a side feeder.

The polyamides, the prepolymers, the impact modifiers and the additives are added during the compounding process in the main hopper.

The compositions were then molded on an injection molding machine (Engel) at a setpoint temperature of 240° C. for the supply and 260° C. for the nozzle and a molding temperature of 60° C. in the shape of dumbbells (see table 3) or bars in order to study the properties of the compositions according to the standards below.

The tensile modulus was measured at 23° C. according to ISO standard 527-1: 2012 on dumbbells of type 1A.

The machine used is of the INSTRON 5966 type. The speed of the crosshead is 1 mm/min for the modulus measurement. The test conditions are 23° C.±2° C., on dry samples.

The compositions are dried compositions.

The impact strength was determined according to ISO 179-1: 2010/1 eA (Charpy impact) on bars of size 80 mm×10 mm×4 mm, V-notched, at a temperature of 23° C.±2° C. at a relative humidity of 50%±10% or at −30° C.±2° C. at a relative humidity of 50%±10% on dry samples.

The elongation at break and tensile strength were measured at 23° C. according to standard ISO 527-1: 2012 on dry sample.

The non-notched Ross Flex fatigue test is conducted in accordance with standard ASTM D1052 09(2014) at 23° C. (the difference is that the fold angle is 60°). Parts 2 mm thick, 150 mm long and 20 mm wide were produced from compositions of the invention (EIn) or comparative compositions (ECn) and then conditioned for 7 days at 70° C. under 62% relative humidity. The number of cycles is 100/min.

Wafers 100×100×2 mm3 were made by injection molding for the transmittance and haze measurements. The following parameters were used:

non-polished mold

ENGEL VICTORY 500, 160T hydraulic press

Injection temperature (feed/nozzle): 260° C./280° C.

Mold temperature: 60 C

Holding time: 20 s

Material holding pressure: 525 bars

Cooling time: 20 s

TABLE 1

| All percentages are expressed by weight. | EC 1 | EC 2 EP 3, 309, 199 B1 (EMS) Ex 20 | EC 3 EP 3,486, 287 A1 (Evonik) Ex 1 | EC 4 | EC5 | EI 1 | EI 2 | EI 3 | EI4 | E15 | EI 6 |
|---|---|---|---|---|---|---|---|---|---|---|---|
| Impact modifier: Kraton™MFG 1901 Kraton (IR = 1.509) | | | | 26.8 | 20.0 | 20.0 | 20.0 | 20.0 | 20.0 | 20.0 | 20.0 |
| Impact Modifier - Paraloid™ EXL 2690 Dow Inc. (IR = 1.514) | | | 5.0 | | | | | | | | |
| Glass fiber CSG 3PA-820S (E FF) Nittobo flat section fibers (IR = 1.560) | | 20.0 | | | 8 | | | | | | |
| Glass fiber CNG 3PA-820S (NE FF) Nittobo flat section fibers (IR = 1.513) | | | | | | 8.0 | 10.0 | 8.0 | 10.0 | 8.0 | 10.0 |
| Standard glass fiber with a circular cross-section Lanxess (IR = 1.560) | 8.0 | | | | | | | | | | |
| Glass fiber with a circular section S-2 AGY® 544 AGY (IR = 1.521) | | | 4.0 | | | | | | | | |
| PA11 mono NH2 prepolymer (IR = 1.518) | | | | 1.6 | | 6.0 | 6.0 | 6.0 | 6.0 | 6.0 | 6.0 |
| Rilsan® PA 11 (IR = 1.518) | 91.7 | | | 47.5 | | 22.7 | 21.9 | 29.9 | 28.9 | 37.1 | 35.9 |
| PA 12 (IR = 1.520) | | 3.9 | 91.0 | | 3.9 | | | | | | |
| Laurolactam (IR = 1.510) | | 3.0 | | | 3.0 | | | | | | |
| 11/B10 | | | | 24.1 | 65.1 | 43.0 | 41.8 | 35.9 | 34.9 | 28.7 | 27.9 |
| Additives | 0.3 | | | | | 0.3 | 0.3 | 0.3 | 0.3 | 0.3 | 0.3 |
| alloy containing 70% of MACMI/MACCM/12 (38/38/24) and 30% of 6I/6T (molar percentage I/T = 2) (IR > 1.540) | | 73.1 | | | | | | | | | |

TABLE 2 / TABLE 2-continued

| All percentages are expressed by weight | EI7 | EI8 | EI9 | EI10 | EI11 | EI12 | EI13 |
|---|---|---|---|---|---|---|---|
| Impact modifier: Kraton™MFG 1901 Kraton (IR = 1.509) | 20.0 | 20.0 | 22.5 | 25.0 | 20.0 | 22.5 | 20.0 |
| Impact Modifier- Paraloid™ EXL 2690 Dow Inc. (IR = 1.514) | | | | | | | |
| Glass fiber CNG 3PA-820S (NE FF) Nittobo flat section fibers (IR = 1.513) | | | | | 8.0 | | |
| Fiberglass with a circular cross-section CN 3J-451 Nittobo (IR = 1.560) | 8.0 | 8.0 | 8.0 | 8.0 | | 8.0 | 8.0 |
| Standard glass fiber with a circular cross-section Lanxess (IR = 1.560) | | | | | | | |
| Glass fiber with a circular cross-section S-2 AGY® 544 AGY (IR = 1.521) | | | | | | | |
| PA11 mono NH2 prepolymer (IR = 1.518) | | 3.0 | 6.0 | 6.0 | 6.0 | 6.0 | 6.0 |

TABLE 2-continued

| All percentages are expressed by weight | EI7 | EI8 | EI9 | EI10 | EI11 | EI12 | EI13 |
|---|---|---|---|---|---|---|---|
| Rilsan ® PA 11 (IR = 1.518) | 43.0 | 40.0 | 35.5 | 34.0 | 37.0 | 35.5 | 29.1 |
| PA 12 (IR = 1.520) Laurolactam | | | | | | | 15.1 |
| 11/B10 (IR = 1.510) | 28.7 | 28.7 | 27.7 | 26.7 | 28.7 | 27.7 | 21.5 |
| Additives | 0.3 | 0.3 | 0.3 | 0.3 | 0.3 | 0.3 | 0.3 |

TABLE 2-continued

| All percentages are expressed by weight | EI7 | EI8 | EI9 | EI10 | EI11 | EI12 | EI13 |
|---|---|---|---|---|---|---|---|

PA11: Rilsan ® (Arkema)
PA11/B10 (10:90 by weight)
Kraton ™ FG 1901: linear triblock copolymer based on styrene and ethylene/butylene, functionalized with maleic anhydride, d = 0.91 g/cm3, supplied by the company Kraton Polymers
Paraloid ™ EXL 2690: methyl methacrylate-butadiene-styrene (MBS) core-shell copolymer
Additives: antioxidant mixture (0.1% by weight) + secondary antioxidant (0.2% by weight)

The injectability and surface appearance were also determined.

The various results are presented in Table 1 in Table 6.

TABLE 3

| | EC 1 | EC 2 EP 3,309,199 B1 (EMS) Ex 20 | EC 3 EP 3,486,287 A1 (Evonik) Ex 1 | EC 4 | EC5 | EI 1 | EI 2 | EI 3 | EI 4 | EI 5 |
|---|---|---|---|---|---|---|---|---|---|---|
| Tensile modulus (GPa) | 2656 | 6870 | 1620 | 930 | — | 1970 | 2140 | 1982 | 2198 | 1965 |
| Elongation at break % | 17.4 | 2.5 | — | 250.0 | — | 8.4 | 6.4 | 9.1 | 7.0 | 10.2 |
| Tensile strength (MPa) | 59.6 | 131.0 | 33.9 | 37.0 | — | 42.9 | 54.2 | 40.9 | 50.8 | 34.1 |
| Impact resiliency at 23° C. | 10.2 | 8.5 | 20.7 | 49.8 | 21 | 22.2 | 21.6 | 22.6 | 22.2 | 22.8 |
| Impact resiliency at −30° C. | 5.4 | — | — | 24.8 | 10.5 | 12.3 | 11.9 | 13.2 | 12.7 | 11.1 |
| Ross flex @23° C. (2 mm) | No break 150,000 cycles | — | No break 200,000 cycles | No break 200,000 cycles | <1000 cycles | No break at 10,000 cycles | No break at 5000 cycles | — | — | No break at 150,000 cycles |
| Haze (%) | 96.5 | 27 | 55 | 16 | 25 | 24 | 27.4 | 23.4 | 29 | 35.8 |
| Transmittance (2 mm) (%) | 62 | 86 | — | 79 | 88 | 81 | 80 | 81 | 77 | 72 |

The EC 2 and EC 3 data do not come from the Applicant but are those indicated in EP 3,309,199 B1 and EP 3,486,287 A1 respectively.

TABLE 4

| | EI 6 | EI 7 | EI 8 | EI 9 | EI 10 | EI 11 | EI 12 | EI 13 |
|---|---|---|---|---|---|---|---|---|
| Tensile modulus (GPa) | 2135 | 1988 | 1970 | 2140 | 1950 | 2355 | 2566 | 2503 |
| Elongation at break (%) | 8.1 | 15.0 | 8.4 | 6.4 | 8.4 | 5.8 | 5.6 | 5.3 |
| Tensile strength (MPa) | 49.6 | 27.6 | 42.9 | 54.2 | 42.2 | 52.6 | 61.5 | 55.7 |
| Impact resiliency at 23° C. | 21.2 | 23.8 | 22.2 | 21.6 | 23.1 | 20.7 | 20.0 | 18.0 |
| Impact resiliency at −30° C. | 10.2 | 12.9 | 12.3 | 11.9 | 12.6 | 10.8 | 11.5 | 10.2 |
| Rossflex @23° C. (2 mm) | No breakage at 100, 000 cycles | — | — | — | — | — | — | — |
| Haze (%) | 35 | 51.3 | 24 | 27.4 | 49.5 | 36.7 | 43.8 | 50.7 |
| Transmittance (2 mm) (%) | 72 | 72.9 | 81 | 80 | 74.2 | 74.2 | 79 | 76.1 |

The dumbbells of type 1A were obtained by injection on an Engel-type injection molding machine:

TABLE 5

|  | EC 1 | EC 2 | EC 3 | EC 4 | EI 1 | EI 2 | EI 3 | EI 4 | EI 5 |
|---|---|---|---|---|---|---|---|---|---|
| Injection temperature (° C.) from the nozzle to the hopper (setpoint value) | 240/260 | 280 | nd | nd | 240/260 | 240/260 | 240/260 | 240/260 | 240/260 |
| Injection pressure (bar, test specimens 1A) | 967 | 130 | nd | nd | 1310 | 1367 | 1333 | 1355 | 1220 |
| Mold temperature (° C.) | 60 | 40 | — | — | 60 | 60 | 60 | 60 | 60 |
| Cycle time (s) | 42 | — | — | — | 42 | 42 | 42 | 42 | 42 |
| Injectability and surface appearance (visual) | OK | OK | — | — | OK | OK | OK | OK | OK |

15

TABLE 6

|  | EI 6 | EI 7 | EI 8 | EI 9 | EI 10 | EI 11 | EI 12 | EI 13 |
|---|---|---|---|---|---|---|---|---|
| Injection temperature (° C.) from the nozzle to the hopper (setpoint value) | 240/260 | 240/260 | 240/260 | 240/260 | 240/260 | 240/260 | 240/260 | 240/260 |
| Injection pressure (bar, test specimens 1A) | 1244 | 1144 | 1145 | 1111 | 978 | 1022 | 1000 | 889 |
| Mold temperature (° C.) | 60 | 60 | 60 | 60 | 60 | 60 | 60 | 60 |
| Cycle time (s) | 42 | 42 | 42 | 42 | 42 | 42 | 42 | 42 |
| Injectability and surface appearance (visual) | OK | OK | OK | OK | OK | OK | OK | OK |

The invention claimed is:

1. A transparent molding composition comprising, by weight, with a total of 100%:
   (A) 35 to 84% of a polyamide mixture comprising:
      10 to 95% by weight of at least one semi-crystalline aliphatic polyamide, whose average number of carbon atoms relative to nitrogen atoms is greater than or equal to 8;
      90 to 5% by weight of at least one amorphous polyamide;
   (B) from 10 to 30% of at least one impact modifier;
   (C) from 6 to 20% of short glass fibers;
   (D) 0 to 10% of at least one prepolymer; and
   (E) 0 to 5% of at least one additive selected from stabilizers, dyes, plasticizers, processing aids or a mixture thereof,
   the index of refraction of each constituent (A), (B), (C) and (D) being included between 1.500 and 1.540, and wherein said composition has no PEBA and has a dry-measured modulus at 23° C. over 1700 MPa.

2. The transparent molding composition according to claim 1, wherein the transmittance is greater than 70%, as measured according to ASTM D1003 on 2 mm thick plates having a width and length of 100 mm*100 mm made in a non-polished mold from said polyamide molding composition.

3. The transparent molding composition according to claim 1, wherein the haze is less than 50% as measured according to ASTM D1003 on plates 2 mm thick having a width and length of 100 mm*100 mm made in a non-polished mold from said polyamide molding composition.

4. The transparent molding composition according to claim 1, wherein the impact resilience is greater than 15 KJ/m2 as determined according to ISO 179-1: 2010/1 eA (Charpy impact) on bars of size 80 mm×10 mm×4 mm, V-notched, at a temperature of 23° C.±2° C. at a relative humidity of 50%±10% on dry samples.

5. The transparent molding composition according to claim 1, wherein the impact modifier is selected from SEBS, SBS and a core-shell structure.

6. The transparent molding composition according to claim 1, wherein the amorphous polyamide is a polyamide of formula XY or A/XY wherein:
   A is a repeating aliphatic unit selected from a unit obtained from the polycondensation of at least one amino acid, a unit obtained from the polycondensation of at least one lactam, and a unit obtained from the polycondensation of at least one aliphatic diamine and at least one aliphatic diacid,
   X is a cycloaliphatic diamine, and
   Y is a dicarboxylic acid, said diacid being selected from an aliphatic diacid, linear or branched, a cycloaliphatic diacid and an aromatic diacid,
   said diamine and said diacid comprising from 4 to 36 carbon atoms.

7. The transparent molding composition according to claim 1, wherein the amorphous polyamide is selected from 11/B10, 12/B10, 11/P10, 12/P10, 11/BI/BT, 12/BI/BT, 11/PI/BT, 12/PI/BT, 11/PI/PT, 12/PI/PT, 11/BI, 12/BI, 11/PI and 12/PI.

8. The transparent molding composition according to claim 1, wherein the semi-crystalline aliphatic polyamide is a mixture of two semi-crystalline aliphatic polyamides whose average number of carbon atoms relative to nitrogen atoms is included between 8 and 14.

9. The transparent molding composition according to claim 1, wherein said semi-crystalline aliphatic polyamide is selected from PA10, PA11, PA12, PA1010, PA1012.

10. The composition according to claim 1, wherein the semi-crystalline aliphatic polyamide is PA11 and the amorphous polyamide is selected from 11/B10, 12/B10, 11/P10, 12/P10, 11/BI/BT, 12/BI/BT, 11/PI/BT, 12/PI/BT, 11/PI/PT and 12/PI/PT.

11. The composition according to claim 1, wherein the semi-crystalline polyamide and/or the amorphous polyamide is(are) partially or completely biosourced.

12. The transparent molding composition according to claim 1, wherein the semi-crystalline aliphatic polyamide is predominant in the mixture (A).

13. The transparent molding composition according to claim 12, wherein it has a resistance to the non-notched Ross Flex fatigue test greater than 50,000 at 23° C., as determined according to standard ASTM D1052 with a non-notched and non-drilled sample and a bending angle of 60°.

14. An article obtained by injection of a composition as defined in claim 12, selected from a sports article, a ski boot, a ski boot part, a rigid shoe with cleats, hockey footwear or a part of hockey footwear, a running shoe, a golf ball or a part of a golf ball, a lacrosse stick, a hockey article, and sport articles for protecting the head, shoulders, elbows, hands, knees, back or shins.

15. The article according to claim 14, wherein the article is an outer sole of a sports shoe allowing, because of its transparency, to see the pattern and the color of the intermediate sole of said sports shoe through the outer sole.

16. The transparent molding composition according to claim 1, wherein the amorphous polyamide is predominant in the mixture (A).

17. An article obtained by injection of the transparent molding composition as defined in claim 16, wherein the article is for electronics, for telecom applications, or for data exchange.

18. A method for preparing a composition as defined in claim 1, including a step of mixing constituents (A), (B), (C), (D) and (E) in an extruder, at a temperature included between 230 and 330° C., to produce granules, granules that will then be injected at a temperature included between 230 and 330° C., on an injection press to produce the desired articles.

19. A transparent shaped article formed from the composition as defined in claim 1, wherein the composition is in the form of a dry mixture or has been compounded in an extruder.

20. A molded composite article which comprises a resin element (I) comprising a composition as defined in claim 1, and a resin element (II) comprising a composition comprising a thermoplastic polymer, wherein the resin element (I) is directly joined or bonded to the resin element (II).

21. A method for producing a molded composite article as defined in claim 20, which comprises heating at least one resin (I) and a resin (II), to attach one resin to the other resin.

* * * * *